United States Patent Office 3,457,081
Patented July 22, 1969

3,457,081
CORN SILAGE PROCESS
Thomas E. Freese, Indianapolis, Ind., assignor to Allied Chemical Corporation, New York, N.Y., a corporation of New York
No Drawing. Filed Oct. 5, 1966, Ser. No. 584,372
Int. Cl. A23l *1/20;* A23k *3/00*
U.S. Cl. 99—8                                                             4 Claims

ABSTRACT OF THE DISCLOSURE

Aqueous ammoniated superphosphoric acid is added to corn forage prior to ensiling to provide corn silage which is highly stable and contains an increased amount of lactic acid.

---

This invention relates to improved corn silage and preparation thereof.

Silage is widely used as a feed for ruminant animals, such as cattle. Silage is obtained by ensiling, i.e., fermenting green forage under certain conditions, hereinafter described.

When green forage from a suitable crop such as corn is placed in a compact mass in an essentially air-tight chamber, e.g., a silo or pit, the following changes take place which convert it into silage: For a time the living plant cells continue to respire, or breathe rapidly using the oxygen in the air entrapped in the mass and giving off carbon dioxide. Within 5 hours practically all the oxygen has been consumed and this prevents the development of molds, which are unable to grow in the absence of oxygen.

Acid-forming bacteria multiply enormously in the silage, and at the end of 2 days each gram of sliage juice may contain many billions of bacteria. These bacteria attack the sugars in the green forage, producing organic acids, chiefly lactic acid, with some acetic acid, and traces of other acids and also of alcohol. The production of acid is the most important change in the process, for acidity prevents the growth of undesirable bacteria, such as cause rotting,, or putrefaction. For good palatability, it is preferred for the silage to have a high lactic acid value and a low acetic acid value.

When enough acid has been formed, the fermentation is checked, and finally the action practically ceases. If air does not gain entrance, the silage will then keep for long periods with but little change. Instances are on record where corn silage 12 years or more old has been of satisfactory quality. If air does penetrate, e.g., as at the top of the silo or adjacent to a crack in the wall, mold will grow and destroy the acid. Putrefactive bacteria can then develop and cause further spoilage.

Cattle and lamb feeding trials have shown the organic acids present in silage to have a high feeding value. This was especially true of lactic acid, the major one found in corn silage. Considerable research effort is therefore being made to find ways to increase the lactic acid content of silage. With its solid stems, high carbohydrate content and generally desirable moisture level, corn is an excellent silage crop that lends itself very nicely to a feeding program.

It is also known that corn silage is somewhat deficient in various elements, such as nitrogen and phosphorus, which are important for the ruminant's growth and health. There has been a continuing interest in supplementing the diet of ruminants to overcome such deficiencies and to provide improved feeds for ruminants which are penned or otherwise confined to limited areas.

Providing a nitrogen and phosphorus-containing feed supplement for ruminants is complex. Such factors as cost and utilization must be considered, for although a wide variety of materials containing these elements are known, many materials are economically unfeasible as supplements in the amounts required. Some, while relatively inexpensive on a weight basis are not properly utilized by the ruminant and therefore are uneconomical because of the relatively large quantities which must be used.

An object of this invention is to provide a nitrogen and phosphorus-containing ruminant feed which is relatively low in cost.

Another object of the present invention is to provide a complete corn silage feed which is highly stable during storage and contains an increased amount of lactic acid.

A further objective of the present invention is to provide a corn silage feed which is palatable to ruminants, assists the symbiotic microflora normally present in the digestive tract of ruminants, and increases the overall consumption of feed and feed efficiency.

It has now been found that corn silage having improved nutritive and keeping characteristics can be obtained by addition of aqueous ammoniated superphosphoric acid to the corn forage prior to ensiling. Preferably, sufficient ammoniated superphosphoric acid is used to provide a silage that will furnish all the phosphorus need of the ruminant. If desired, a small proportion, e.g., up to about 5% by weight, based on the weight of the silage, of calcium carbonate, preferably ground limestone, may be added to the silage. Urea can also be added, if desired, to provide additional nitrogen value.

Aqueous ammoniated superphosphoric acid can be produced by evaporating aqueous wet process phosphoric acid to form superphosphoric acid, which is then ammoniated.

The aqueous ammoniated superphosphoric acid of this invention has a pH of from about 5 to 8, preferably about 6; a nitrogen content of from about 9% to 12% by weight, preferably from about 10% to 11% by weight; a total phosphorus content measured as $P_2O_5$ of from about 28% to 39% by weight, preferably about 34% to 38% by weight, and wherein polymeric phosphates represent from about 30% to 70% by weight, preferably from about 55% to 65% by weight, based on the weight of the total phosphorus content. The polymeric phosphates include pyrophosphates and polyphosphates.

An aqueous ammoniated superphosphoric acid having the following properties which will hereinafter be referred to as "Solution A," was found to be particularly usefull for purposes of the present invention:

| | | |
|---|---|---|
| Nitrogen | percent by weight | 10 |
| Phosphorus (as $P_2O_5$) | do | 34 |
| Trace minerals | do | 1–2 |
|     Iron ($Fe_2O_3$) | do | Ca. 1.0 |
|     Calcium (CaO) | do | Ca. 0.1 |
|     Magnesium (MgO) | do | Ca. 0.3 |
| pH | | 6.0 |
| Specific gravity at 60° F. | | 1.4 |
| Salting out temperature | ° F | 0 |

Distribution as percent by weight of the ammonium phosphates of Solution A was about:

| | Percent |
|---|---|
| Ammonium orthophosphate | 37 |
| Ammonium pyrophosphate | 49 |
| Ammonium tripolyphosphate | 8 |
| Ammonium tetrapolyphosphate | 5 |
| Higher ammonium phosphates | 1 |

The moisture content of the corn forage is a factor in the ensiling process. Green corn is suitable as the corn forage, preferably cut at the early-dent stage. It is also preferred to use relatively fresh cut corn while it has its highest natural moisture content rather than cut green corn which has been permitted to lose moisture on standing.

Corn forage makes the best silage when the dry matter content is not less than about 28%. If the forage has less dry matter, there will be considerable loss of juice, and the silage is apt to be of poor quality.

If the percentage of water in the silage is too high, an undesirable type of fermentation is apt to occur, in which strong-smelling unpalatable butyric acid is formed. If the forage is too dry, it tends to mold.

It is preferred that the corn forage be chopped fine by a silage cutter. Finely chopped forage packs more densely, it makes better silage, and the loss of nutrients is reduced to a minmum. Silage cutters are generally set to cut the forage into pieces not over one-half inch long. For corn in the early-dent stage, a half-inch cut is satisfactory. For more mature corn, a one-quarter inch cut is best. The aqueous ammoniated superphosphoric acid is conveniently sprayed onto the finely-chopped forage as the silo is filled. Alternatively, it may be added by running it into the blower-fan case as the silage is blown to the silo. Regular whole plant corn silages are preferably made with the addition of at least sufficient ammoniated superphosphoric acid to supply the minimum phosphorus needs of the ruminant, e.g., 6 to 12 grams phosphorus for a 700-pound cow consuming about 50 pounds of silage per day.

Aqueous ammoniated superphosphoric acid may be advantageously added to the corn prior to ensiling, in amounts up to those exceeding the liquid-holding capacity of the corn mass. When the liquid-holding capacity is exceeded, liquid begins to seep through the mass, which seepage is undesirable as it results in extraction of solutes and concentration thereof at the lower portions of the mass.

Aqueous ammoniated superphosphoric acid was found to have value as a beneficial additive to corn silage on the basis of the following observations:

(1) Markedly increases the lactic acid value without significantly increasing the acetic acid value.

(2) Increases the equivalent protein value.

(3) Increases the phosphorus value.

(4) Does not release ammonia as do other nonprotein nitrogen products used in treating corn silage.

(5) Helps in maintaining a favorable pH level during ensiling.

(6) Helps in achieving a favorable balance between optimum fermentation and optimum preservation.

(7) The ease of handling, applying, and blending the liquid additive is vastly superior to dry additives.

(8) The physical nature of aqueous ammoniated superphosphoric acid greatly facilitates the addition of other nutrients to it, such as trace minerals and non-protein nitrogen products, e.g., where a complete balanced ration is desired.

(9) Provides a noncalcium source of phosphorus, which is particularly advantageous in locations where there is fear of formation of urinary calculi in ruminants.

Comparative tests were carried out and are hereinafter presented for the purpose of illustrating this invention.

EXAMPLE 1

Two corn silage treatments were made using Solution A, the aqueous ammoniated superphosphoric acid described above. The forage was a hybrid dent field corn, cut in the early-dent state, and chopped into one-half inch pieces. The moisture value of the forage was about 72%.

The treatment plan was to use the Solution A at levels of about 35 and 65 pounds of Solution A per ton of forage. A control silage was also prepared with no Solution A.

The steel silos that were used measured about 12 feet in diameter and 30 feet high. The silos had a holding capacity for 50 to 60 tons of corn silage.

In the first silo, the forage was sprayed with Solution A at the rate of 5.6 gallons (about 65 pounds) of Solution A per ton of forage. In the second silo, the forage was sprayed with an equivolume solution of water and Solution A at a rate equivalent to 3 gallons (about 35 pounds) of Solution A per ton of forage. No Solution A was added to the control silage. A Kools blower which had a rated capacity of one ton per minute was used in filling the silos. The Solution A was sprayed on the forage as it was being conveyed into the blower.

After 90 days storage, the silage was evaluated in laboratory and animal feeding tests. Quality of the silage in storage seemed good by appearance and odor. Acidity (defined as milliliter of 0.1 N KOH required to titrate a 9-gram sample in 60 ml. of water to pH 7.0) and pH on the control and two treatments gave the following results:

| Percent Solution A added | Acidity | pH |
|---|---|---|
| 0 | 11.8 | 4.0 |
| 1.75 | 14.7 | 4.1 |
| 3.25 | 16.1 | 3.9 |

Feeding trials were carried out as follows: Twenty-four 700 to 800-pound heifers were divided into three groups and fed silage containing 0, 1.75, and 3.25% Solution A. About 1% ground limestone was added to both the 1.75% and 3.25% material at feeding time. The animals were observed to feed normally. Blood phosphorus was increased from 6.30 to 7.75 mg./100 ml. by the 1.75% Solution A feed, and from 6.34 to 8.84 mg./100 ml. by the 3.25% Solution A feed. These results demonstrate the availability of the phosphorus to the animals and are considered very favorable.

Heifers were also observed to feed normally on 1.75% material to which no limestone had been added.

EXAMPLE 2

Additional corn silage treatments were made following the general procedure of Example 1 but on a smaller scale to study the effect on the silage composition of varying the amount of Solution A added. Treatments were made using 0, 3.5, 7.0, and 14.0 grams of Solution A per pound of chopped forage. After three months storage, the silage samples were analyzed. Results are indicated in the following table:

| Silage analysis | Treatment (g. Solution A/lb. forage) | | | |
|---|---|---|---|---|
| | 0 g./lb. | 3.5 g./lb. | 7.0 g./lb. | 14.0 g./lb. |
| $NH_4$-nitrogen, percent | 0.04 | 0.28 | 0.55 | 0.78 |
| Nonprotein nitrogen, percent | 0.4 | 0.7 | 0.9 | 1.3 |
| Crude protein, percent | 7.1 | 8.6 | 9.1 | 11.3 |
| Total nitrogen, percent | 1.1 | 1.3 | 1.5 | 1.8 |
| Acetic acid, percent | 3.2 | 3.4 | 3.2 | 3.3 |
| Lactic acid, percent | 7.0 | 7.6 | 8.0 | 8.5 |
| pH | 4.2 | 4.1 | 4.3 | 4.3 |
| Dry matter, percent | 38.3 | 41.5 | 40.2 | 39.2 |

These data clearly show that the addition of ammoniated superphosphoric acid resulted in an advantageous increase in the lactic acid content of the silage. This is quite unexpected, especially in view of the fact that the acetic acid content was not significantly increased.

I claim:

1. A process for the production of improved corn silage which comprises adding aqueous ammoniated superphosphoric acid to corn forage prior to ensiling, said aqueous ammoniated superphosphoric acid having a nitrogen content of from about 9 to 12%, by weight, a total phosphorus content, measured as $P_2O_5$, of from about 28 to 39%, by weight, and wherein from about 30 to 70%, by weight, based on the weight of the total phosphorus content, is comprised of polymeric phosphates, and ensiling the treated silage.

2. A process according to claim 1, wherein the aqueous ammoniated superphoric acid has a nitrogen content of from about 10 to 11%, by weight, a total phosphorus content, measured as $P_2O_5$, of from about 34 to 38%, by weight, and wherein from about 55 to 65%, by weight, based on the weight of the total phosphorus content, is comprised of polymeric phosphates.

3. A process according to claim 1, wherein the aqueous ammoniated superphosphoric acid has a nitrogen content of about 10%, by weight, a total phosphorus content, measured as $P_2O_5$, of about 34%, by weight, and wherein about 63%, by weight, based on the weight of the total phosphorus content, is comprised of polymeric phosphates.

4. A process according to claim 1, wherein ground limestone is admixed with the corn silage at feeding time.

References Cited
UNITED STATES PATENTS

| | | |
|---|---|---|
| 2,213,127 | 8/1940 | Friedrich et al. |
| 2,346,072 | 4/1944 | Haskell et al. |
| 3,180,735 | 4/1965 | Titus _____ 99—2 |

OTHER REFERENCES

Morrison: Feeds and Feedings, 22d edition, 1957.

LIONEL M. SHAPIRO, Primary Examiner

NORMAN ROSKIN, Assistant Examiner

UNITED STATES PATENT OFFICE
CERTIFICATE OF CORRECTION

Patent No. 3,457,081                                   July 22, 1969

Thomas Earl Freese

It is certified that error appears in the above identified patent and that said Letters Patent are hereby corrected as shown below:

Column 1, line 34, change "sliage" to -- silage --; claim 2, line 74, change "superphoric" to -- superphosphoric --.

Signed and sealed this 25th day of November 1969.

(SEAL)
Attest:

Edward M. Fletcher, Jr.
Attesting Officer

WILLIAM E. SCHUYLER, JR.
Commissioner of Patents